Nov. 10, 1959  M. D. DE MONG  2,912,584
FULL WAVE DETECTOR
Filed March 22, 1957
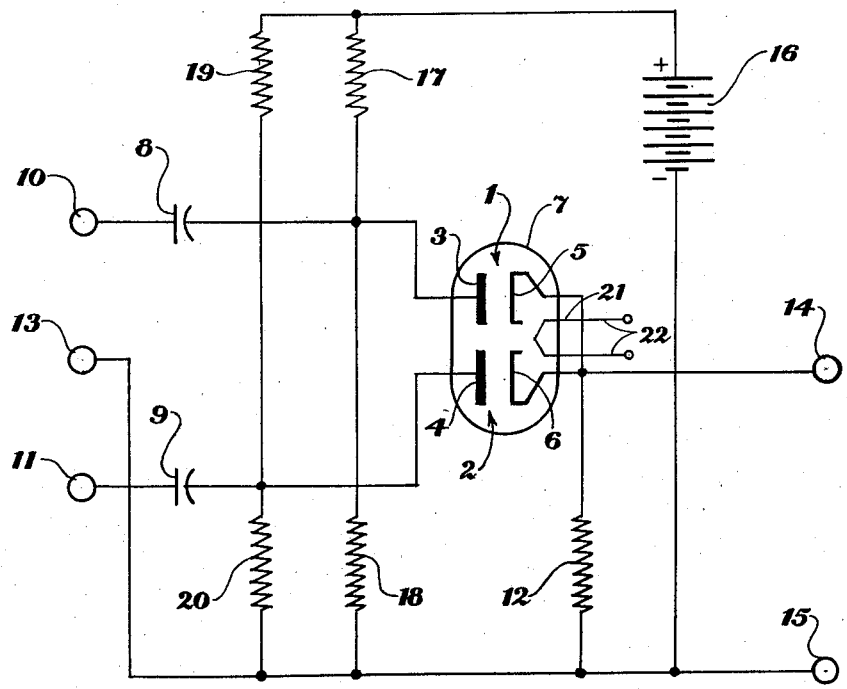
Maurice D. De Mong
INVENTOR.
BY
ATTORNEYS United States Patent Office 2,912,584
Patented Nov. 10, 1959

2,912,584
FULL WAVE DETECTOR

Maurice D. De Mong, Torrance, Calif., assignor, by mesne assignments, to the United States of America as represented by the Secretary of the Navy Application March 22, 1957, Serial No. 647,930

1 Claim. (Cl. 250—27)

This invention relates to an improved full wave electronic detector which is particularly effective for the detection of extremely low level signals.

In conventional full wave detectors, utilizing vacuum tube diodes, considerable difficulty is encountered in satisfactorily detecting signals of relatively low amplitude. This appears to be primarily due to the cumulative effect of several factors, such as heater-to-cathode leakage, initial electron velocity, and contact potential. Because of these factors it frequently occurs that one or the other of the positive or negative halves of an input signal will fail to appear at the output of the detector or, if it does appear, it will be of such low value as to be masked by "noise."

It is an object of this invention to provide a full wave detector which will overcome the above defects to a quite considerable degree.

A further object is to provide such a full wave detector which will present relatively light loading upon the source of input signals.

These objects are attained by biasing both halves of the full wave detector so that, in the absence of any input signal, both halves will be conducting. At the same time a relatively high resistance is used as a load resistor so that variations in the internal dynamic resistance of the rectifier halves will be effectively swamped.

Further objects will become apparent from the following description and drawing wherein the single figure constitutes a schematic diagram of a detector incorporating my invention.

As shown in the drawing the detector comprises a pair of diode sections 1 and 2 having anodes 3 and 4 and indirectly heated cathodes 5 and 6 respectively. While obviously the diode sections could be separate tubes, they are shown herein, for purposes of illustration, as being incorporated in a common envelope 7. A common heater 21 is arranged to be connected by leads 22 to any suitable low voltage source for heating the cathodes 5 and 6. The anodes 3 and 4 are connected through suitable coupling condensers 8 and 9 to a pair of input terminals 10 and 11. The cathodes 5 and 6 are connected together to one end of a load resistor 12, the other end of which is connected to a common input terminal 13. Output from the detector is obtained between the output terminals 14 and 15 which are, as shown, connected directly across the load resistor 12.

As thus far described, the detector is quite conventional and is adapted to detect a pair of balanced input signals of opposite phase applied respectively between the input terminals 10 and 13 and the terminals 11 and 13. However, for the reasons outlined above, it is found that such a detector is inadequate for detecting extremely small signals. This difficulty is overcome in the present invention by applying a positive bias to the anodes 3 and 4 of the two diode sections so that, in the absence of input signals, both diode sections will be conducting. While this bias could obviously be applied in many different ways, for purposes of illustration I have shown a battery 16, serving as a source of D.C. voltage, the negative side of which is connected to the lower end of the load resistor 12 and the positive side of which is connected to one end of a pair of voltage dividers formed by the resistors 17 and 18 and the resistors 19 and 20 respectively. The other ends of these voltage dividers are returned directly to the negative side of battery 16. The junction between resistors 17 and 18 is connected directly to the anode 3 of diode section 1, while the corresponding junction between resistors 19 and 20 is similarly connected to the anode 4 of diode section 2. The two resistors 17 and 19 have the same value of resistance, and likewise the resistors 18 and 20 are of equal value so that the bias applied to each diode section will be the same. Resistors 18 and 20 should be of sufficiently high value that they will not unduly load the inputs. Thus both diode sections will normally be conductive, current flowing from the battery 16 through the resistor 17 or 19, as the case may be, the anode 3 or 4, the cathode 5 or 6, and the load resistor 12, back to the negative side of the battery.

Resistor 12 is preferably of sufficiently high value that it exceeds to a considerable extent the dynamic resistance of the diode sections under these conditions. Any variation between the two diode sections is therefore quite effectively swamped. Moreover, since the two diode sections will both be conducting under no-signal conditions, the smallest positive signal appearing at either terminal 10 or 11 will result in a corresponding positive output at the output terminal 14. During the next half cycle, when the signal is positive upon the other input terminal, the other diode section will be effective to produce a similar change in the output across load resistor 12. While the output signal will, of course, be superimposed upon the normal D.C. voltage drop across resistor 12, it can readily be separated therefrom as by means of a suitable coupling condenser (not shown) connected between the output terminal 14 and the following load or circuit.

While the specific value of the components utilized are not particularly critical, the following values have been found to be effective when utilizing a type 6112 vacuum tube, with the plate and grid of each section thereof connected together to constitute the anode 3 or 4. With such a tube, and a battery 16 or other D.C. voltage source of 250 volts, excellent results are produced when resistors 17 and 19 are 22 megohms, resistors 18 to 20 are 470,000 ohms, and load resistor 12 is 2.2 megohms.

As previously stated it will be apparent to those skilled in the art that many other arrangements for applying bias of the proper polarity to the two anode sections may be employed without departing from the principle of operation of the invention. While the device illustrated is intended to provide a positive polarity output signal, the principle is equally applicable to a detector in which output of negative polarity is desired, appropriate changes in the biasing polarity being obviously within the ability of those skilled in the art. Other changes may likewise be made without departing from the spirit and scope of the invention as defined by the appended claim.

I claim:

A full wave detector comprising a pair of diode sections having anode and cathode elements, a load impedance having one end connected directly to said cathode elements and having a relatively high resistance relative to the dynamic resistance of the diode sections to effectively swamp any variations which may exist in the internal dynamic resistance of the diode sections, a source of direct current potential, a pair of similar relatively high impedance voltage dividers connected across said source, means connecting an intermediate point on one of the dividers to one of the anode elements, means connecting a corresponding intermediate point on the other of the dividers to the other of the anode elements, means connecting one side of said source to the other end of said load impedance to render said diode sections normally conductive, means for coupling an input signal of a given phase between said other end of the load impedance and said one of the anode elements, and means for coupling an input signal of a phase opposite said given phase between said other end of the load impedance and said other of the anode elements.

References Cited in the file of this patent

UNITED STATES PATENTS

| | | |
|---|---|---|
| 1,869,331 | Ballantine | July 26, 1932 |
| 1,994,506 | Duft | Mar. 16, 1935 |
| 2,243,141 | Weagant | May 27, 1941 |

FOREIGN PATENTS

| | | |
|---|---|---|
| 514,779 | Belgium | Apr. 13, 1953 |